(12) United States Patent
Rothing

(10) Patent No.: US 6,318,569 B1
(45) Date of Patent: Nov. 20, 2001

(54) DETACHABLE STORAGE RACK FOR A METALLIC STRUCTURE

(76) Inventor: Reginald Q. Rothing, 102001 Overseas Hwy., Key Largo, FL (US) 33037

(*) Notice: Subject to any disclaimer, the term of this patent is extended or adjusted under 35 U.S.C. 154(b) by 0 days.

(21) Appl. No.: 09/607,464

(22) Filed: Jun. 30, 2000

(51) Int. Cl.[7] ..................................................... A47F 5/00
(52) U.S. Cl. ........................... 211/90.01; 211/DIG. 1; 108/42; 108/152; 248/206.5
(58) Field of Search .................... 211/DIG. 1, 87.01, 211/86.01, 88.01, 90.01, 90.02, 90.03, 90.04; 108/42, 149, 152; 248/243, 206.5, 205.3, 206.3

(56) References Cited

U.S. PATENT DOCUMENTS

| | | |
|---|---|---|
| D. 29,442 | 10/1898 | Connally . |
| D. 397,898 | 9/1998 | Walters-Dowding et al. . |
| 3,017,036 * | 1/1962 | Albert et al. . |
| 3,043,289 * | 7/1962 | Fox . |
| 3,432,134 * | 3/1969 | Forschmidt . |
| 3,966,056 * | 6/1976 | Larson ............................. 105/152 X |
| 4,376,521 * | 3/1983 | Walters ............................. 108/152 X |
| 4,714,305 | 12/1987 | Service . |
| 5,154,330 | 10/1992 | Haynes . |
| 5,351,813 | 10/1994 | Golovan . |
| 5,711,288 | 1/1998 | Sparks . |
| 5,779,067 * | 7/1998 | Reaney ............................. 211/90.04 |
| 5,803,275 * | 9/1998 | Schweitzer ....................... 211/88.01 |
| 5,913,433 * | 6/1999 | Belokin ............................. 211/90.01 |
| 5,941,623 * | 8/1999 | Linehan ........................ 211/88.01 X |
| 6,179,135 * | 1/2001 | Simpson .................... 211/DIG. 1 X |

* cited by examiner

*Primary Examiner*—Robert W Gibson, Jr.

(57) ABSTRACT

A detachable storage rack for a metallic structure for organizing and storing small bottles and containers within reach of the user. The detachable storage rack for a metallic structure includes one or more support members each including a wall member having a back side and a top edge; and also includes one or more shelf members each having ends and each being securely attached to a respective support member; and further includes an attachment assembly for detachably attaching the one or more support members to the metallic structure including a refrigerator.

8 Claims, 4 Drawing Sheets

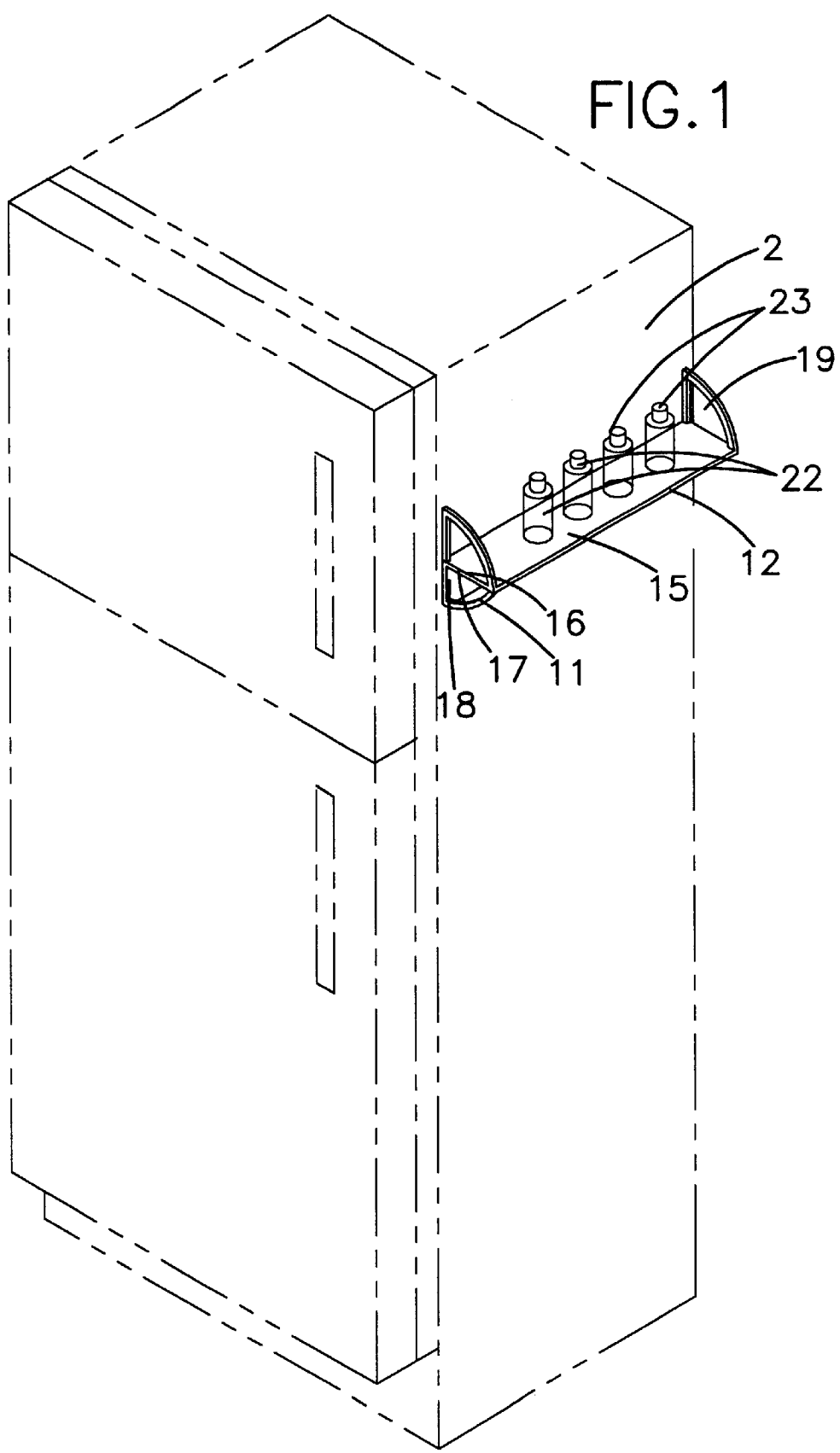

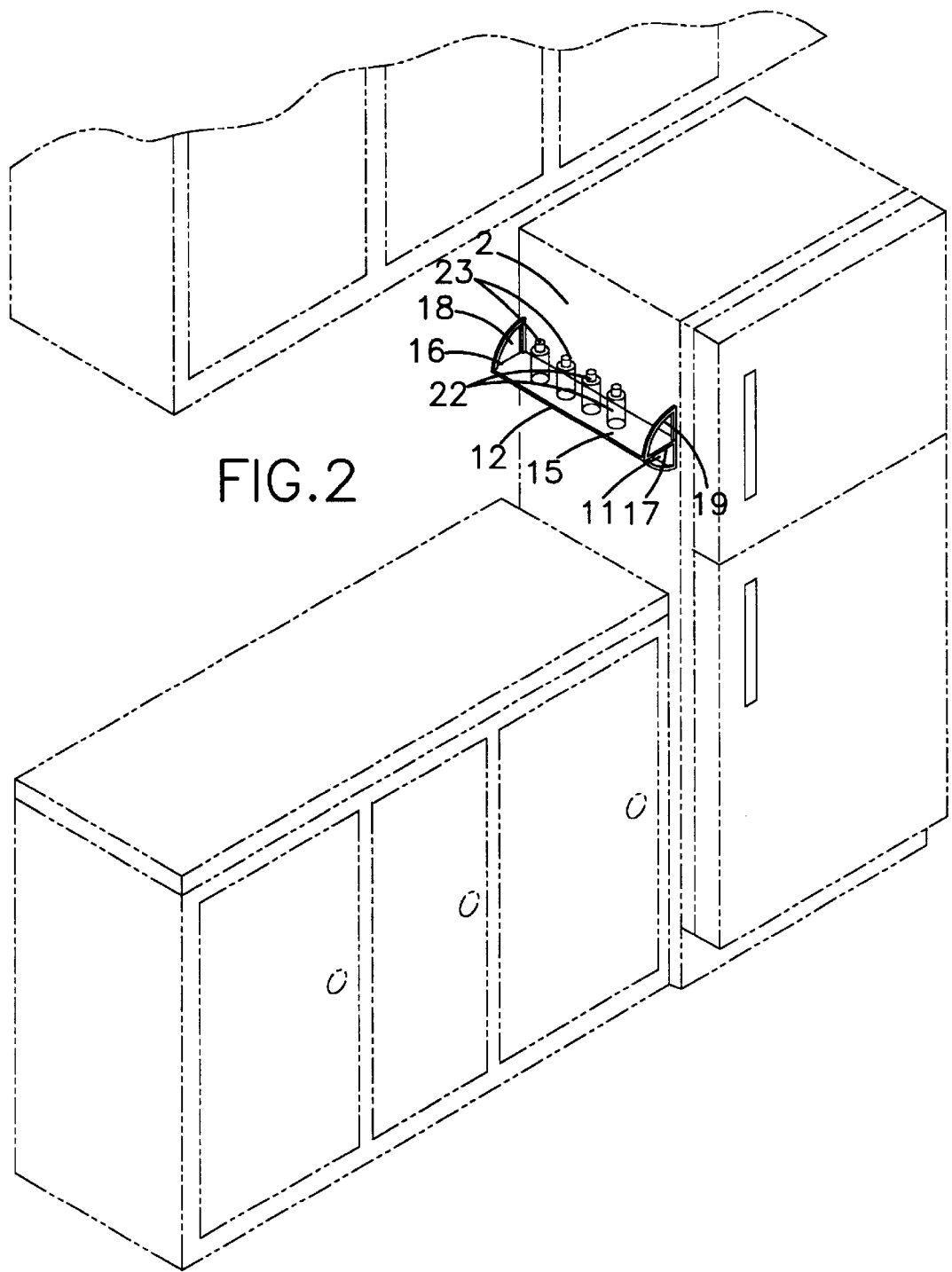

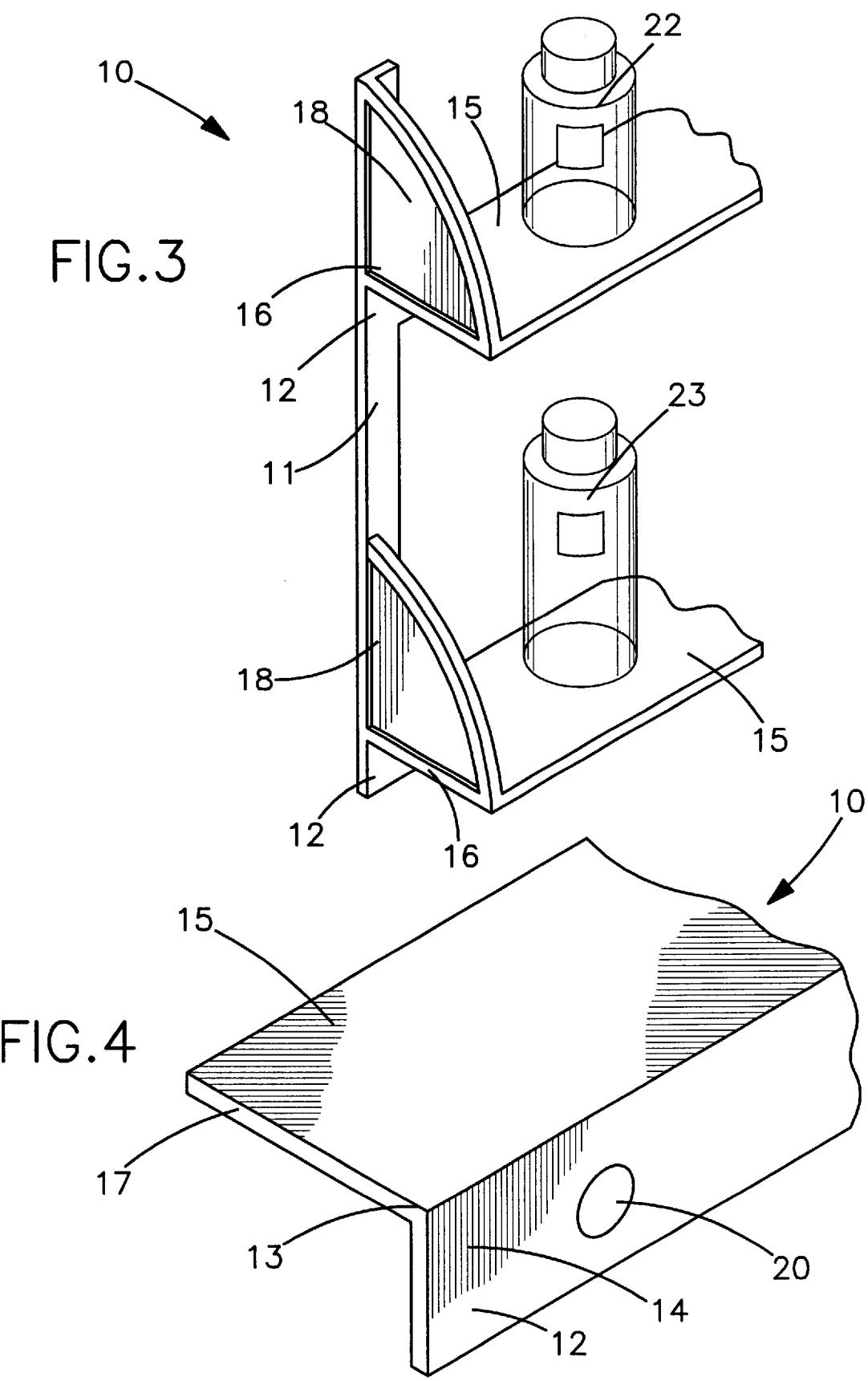

DETACHABLE STORAGE RACK FOR A METALLIC STRUCTURE

BACKGROUND OF THE INVENTION

1. Field of the Invention

The present invention relates to a storage rack and more particularly pertains to a new detachable storage rack for a metallic structure for organizing and storing small bottles and containers within reach of the user.

2. Description of the Prior Art

The use of a storage rack is known in the prior art. More specifically, a storage rack heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,351,813; U.S. Pat. No. 5,711,288; U.S. Pat. No. 5,154,330; U.S. Pat. No. Des. 29,442; U.S. Pat. No. Des. 397,898; and U.S. Pat. No. 4,714,305.

While these devices fulfill their respective, particular objectives and requirements, the aforementioned patents do not disclose a new detachable storage rack for a metallic structure. The inventive device includes one or more support members each including a wall member having a back side and a top edge; and also includes one or more shelf members each having ends and each being securely attached to a respective support member; and further includes an attachment assembly for detachably attaching the one or more support members to the metallic structure including a refrigerator.

In these respects, the detachable storage rack for a metallic structure according to the present invention substantially departs from the conventional concepts and designs of the prior art, and in so doing provides an apparatus primarily developed for the purpose of organizing and storing small bottles and containers within reach of the user.

SUMMARY OF THE INVENTION

In view of the foregoing disadvantages inherent in the known types of storage rack now present in the prior art, the present invention provides a new detachable storage rack for a metallic structure construction wherein the same can be utilized for organizing and storing small bottles and containers within reach of the user.

The general purpose of the present invention, which will be described subsequently in greater detail, is to provide a new detachable storage rack for a metallic structure which has many of the advantages of the storage rack mentioned heretofore and many novel features that result in a new detachable storage rack for a metallic structure which is not anticipated, rendered obvious, suggested, or even implied by any of the prior art storage rack, either alone or in any combination thereof.

To attain this, the present invention generally comprises one or more support members each including a wall member having a back side and a top edge; and also includes one or more shelf members each having ends and each being securely attached to a respective support member; and further includes an attachment assembly for detachably attaching the one or more support members to the metallic structure including a refrigerator.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new detachable storage rack for a metallic structure which has many of the advantages of the storage rack mentioned heretofore and many novel features that result in a new detachable storage rack for a metallic structure which is not anticipated, rendered obvious, suggested, or even implied by any of the prior art storage rack, either alone or in any combination thereof.

It is another object of the present invention to provide a new detachable storage rack for a metallic structure which may be easily and efficiently manufactured and marketed.

It is a further object of the present invention to provide a new detachable storage rack for a metallic structure which is of a durable and reliable construction.

An even further object of the present invention is to provide a new detachable storage rack for a metallic structure which is susceptible of a low cost of manufacture with regard to both materials and labor, and which accordingly is then susceptible of low prices of sale to the consuming public, thereby making such detachable storage rack for a metallic structure economically available to the buying public.

Still yet another object of the present invention is to provide a new detachable storage rack for a metallic structure which provides in the apparatuses and methods of the prior art some of the advantages thereof, while simultaneously overcoming some of the disadvantages normally associated therewith.

Still another object of the present invention is to provide a new detachable storage rack for a metallic structure for organizing and storing small bottles and containers within reach of the user.

Yet another object of the present invention is to provide a new detachable storage rack for a metallic structure which includes one or more support members each including a wall member having a back side and a top edge; and also includes one or more shelf members each having ends and each being securely attached to a respective support member; and further includes an attachment assembly for detachably attaching the one or more support members to the metallic structure including a refrigerator.

Still yet another object of the present invention is to provide a new detachable storage rack for a metallic structure that easily and conveniently allows the user to place the storage wherever needed.

Even still another object of the present invention is to provide a new detachable storage rack for a metallic structure that places certain items that the user often needs within handy reach.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective view of a new detachable storage rack for a metallic structure according to the present invention shown in use.

FIG. 2 is another perspective view of the present invention shown in use.

FIG. 3 is a perspective view of the multiple shelf members and support members of the present invention.

FIG. 4 is a perspective view of the present invention.

DESCRIPTION OF THE PREFERRED EMBODIMENT

Figure 6:
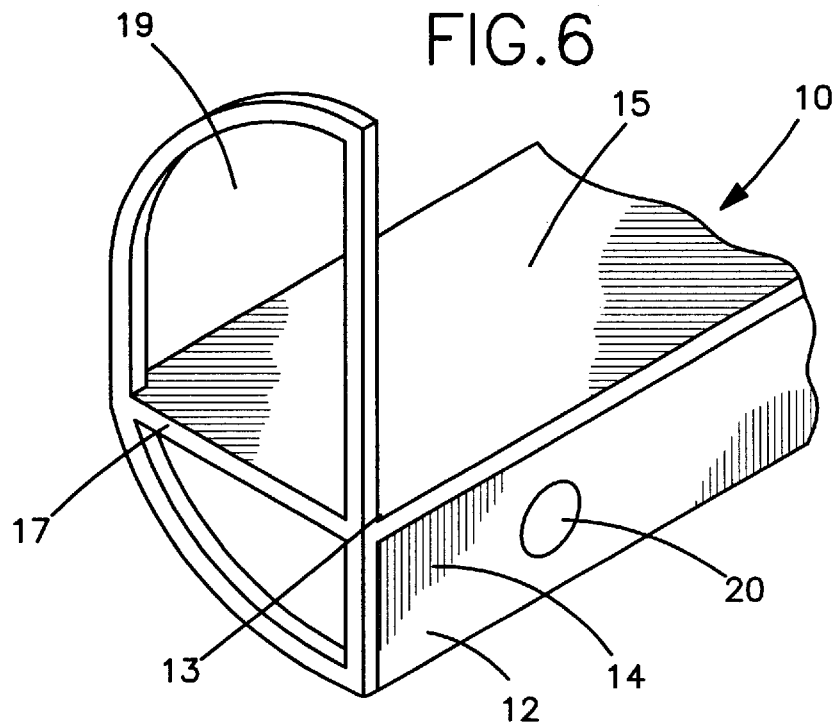
FIG. 6 is a perspective view of another alternate embodiment of the present invention.
Figure 5:
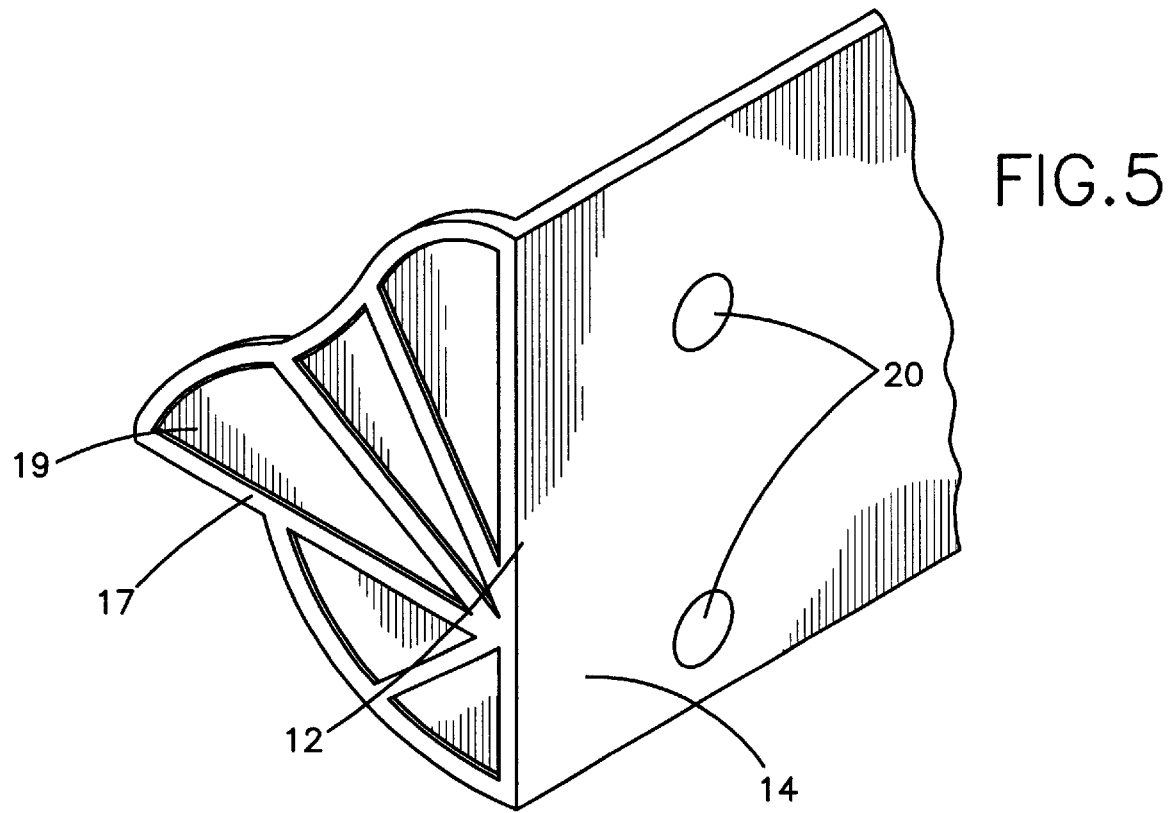
FIG. 5 is a perspective view of an alternate embodiment of the present invention.

With reference now to the drawings, and in particular to FIGS. 1 through 6 thereof, a new detachable storage rack for a metallic structure embodying the principles and concepts of the present invention and generally designated by the reference numeral 10 will be described.

As best illustrated in FIGS. 1 through 6, the detachable storage rack for a metallic structure 10 generally comprises one or more support members 11 each including a wall member 12 having a back side 14 and a top edge 13 with each wall member 12 having a length measuring no more than 24 inches and having a width of approximately 1 inch. The storage rack for a metallic structure 10 also comprises one or more shelf members 15 each having ends 16,17 and each being securely and conventionally attached and conventionally fastened to a respective wall member 12. Each shelf member 15 is generally disposed perpendicular to the respective wall member 12 with each shelf member 15 having a length of no more than 24 inches and having a width of approximately 2 ½ inches. Each shelf member 15 is securely and conventionally attached upon the top edge 13 of the respective wall member 12, and as an alternate embodiment, each shelf member 15 includes end walls 18,19 each being securely and conventionally attached at a respective end 16,17 of the shelf member 15.

Means for detachably attaching one or more support members 11 to the metallic structure 21 including a refrigerator includes magnetic members 20 being spaced apart and securely and conventionally attached to the back side 14 of each wall member 12 with each of the magnetic members 20 being essentially a disc-like member.

In use, the user can quickly attach the storage rack 10 to any metallic surface 21 such as a refrigerator, storage cabinet, and lockers using the magnetic members 20, and the user can place and store small bottles 23 and small containers 22 upon the one or more shelf members 15.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A detachable storage rack for a metallic structure comprising:

one or more support members each including a wall member having a back side and a top edge;

one or more shelf members each having ends and each being securely attached to a respective said support member;

means for detachably attaching said one or more support members to the metallic structure including a refrigerator;

wherein said means for detachably attaching said one or more support members to the metallic structure includes magnetic members being spaced apart and securely attached to said back side of each said wall member;

wherein each of said magnetic members is essentially a disc-like member;

wherein each said wall member has a length measuring no more than 24 inches and has a width of approximately 1 inch;

wherein each said shelf member is generally disposed perpendicular to a respective said support member;

wherein each said shelf member has a length of no more than 24 inches and has a width of approximately 2 ½ inches; and wherein each said shelf member is securely attached upon said top edge of a respective said wall member.

2. A detachable storage rack for a metallic structure comprising:

one or more support members each including a wall member having a back side and a top edge, each said wall member having a length measuring no more than 24 inches and having a width of approximately 1 inch;

one or more shelf members each having ends and each being securely attached to a respective said wall member, each said shelf member being generally disposed perpendicular to a respective said wall member, each said shelf member having a length of no more than 24 inches and having a width of approximately 2 ½ inches, each said shelf member being securely attached upon said top edge of a respective said wall member, each said shelf member including end walls each being securely attached at a respective said end thereof; and means for detachably attaching said one or more support members to the metallic structure including a refrigerator including magnetic members being spaced apart and securely attached to said back side of each said wall member, each of said magnetic members being essentially a disc-like member.

3. A detachable storage rack for a metallic structure comprising:

one or more support members each including a wall member having a back side and a top edge;

one or more shelf members each having ends and each being securely attached to a respective said support member; and means for detachably attaching said one or more support members to the metallic structure including a refrigerator;

wherein each said shelf member is securely attached upon said top edge of a respective said wall member;

wherein said means for detachably attaching said one or more support members to the metallic structure includes magnetic members being spaced apart and securely attached to said back side of each said wall member.

4. A detachable storage rack for a metallic structure as described in claim 3, wherein each of said magnetic members is essentially a disc-like member.

5. A detachable storage rack for a metallic structure as described in claim 3, wherein each said wall member has a length measuring no more than 24 inches and has a width of approximately 1 inch.

6. A detachable storage rack for a metallic structure as described in claim 3, wherein each said shelf member is generally disposed perpendicular to a respective said support member.

7. A detachable storage rack for a metallic structure as described in claim 3, wherein each said shelf member has a length of no more than 24 inches and has a width of approximately 2 ½ inches.

8. A detachable storage rack for a metallic structure as described in claim 3, wherein each said shelf member includes end walls each being securely attached at a respective said end thereof.

\* \* \* \* \*